Nov. 17, 1953
R. B. MORTON
2,659,097
WINDSHIELD WIPER
Filed May 18, 1945
3 Sheets-Sheet 1
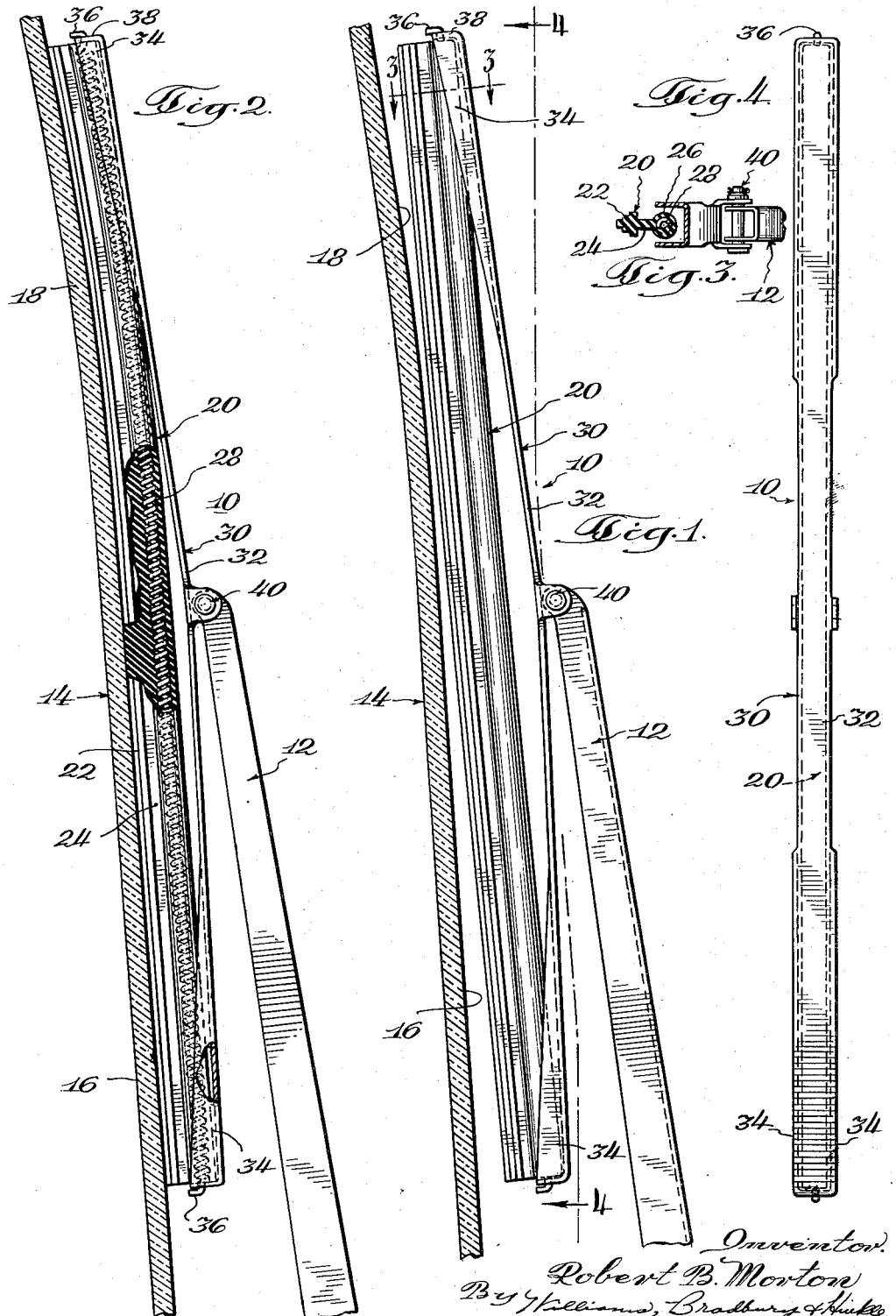

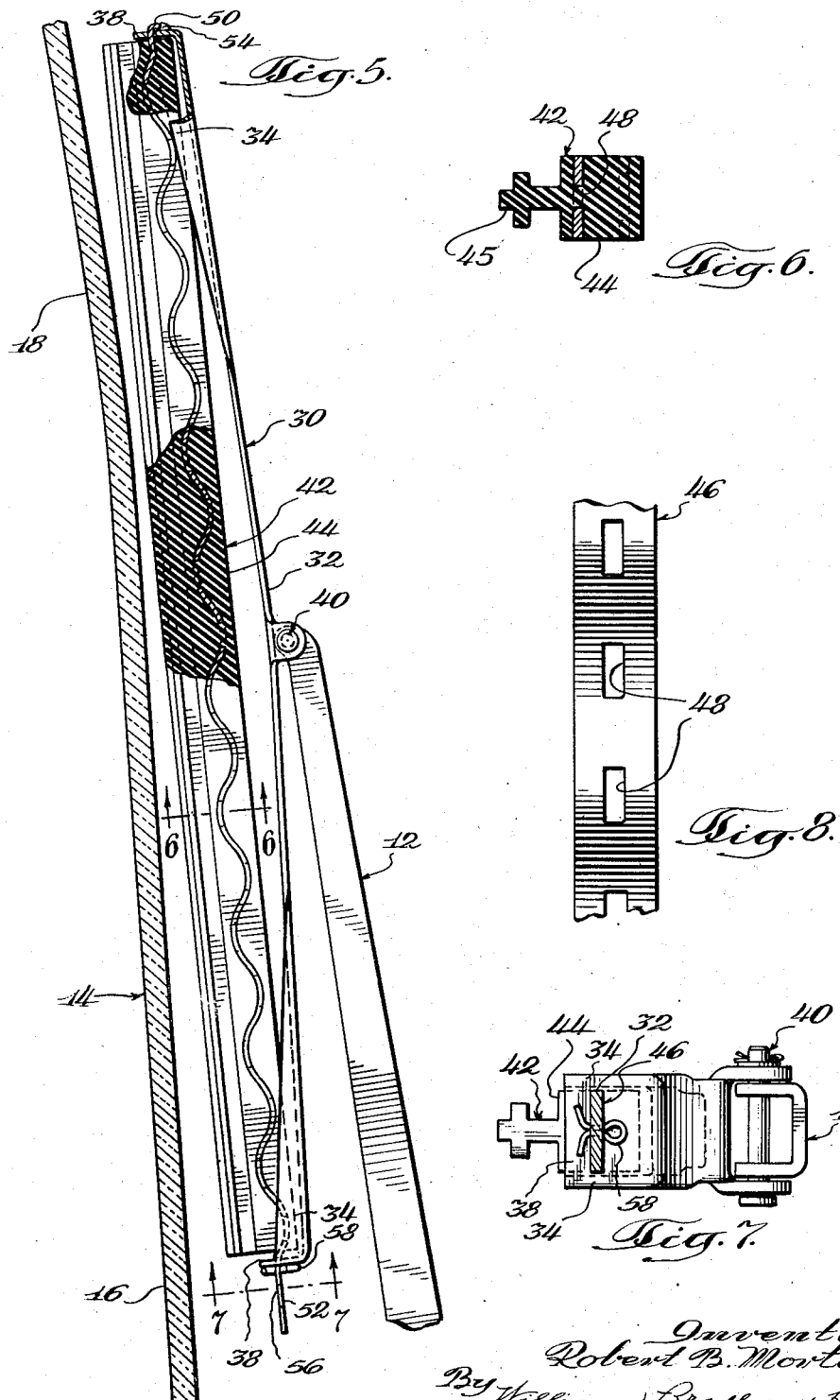

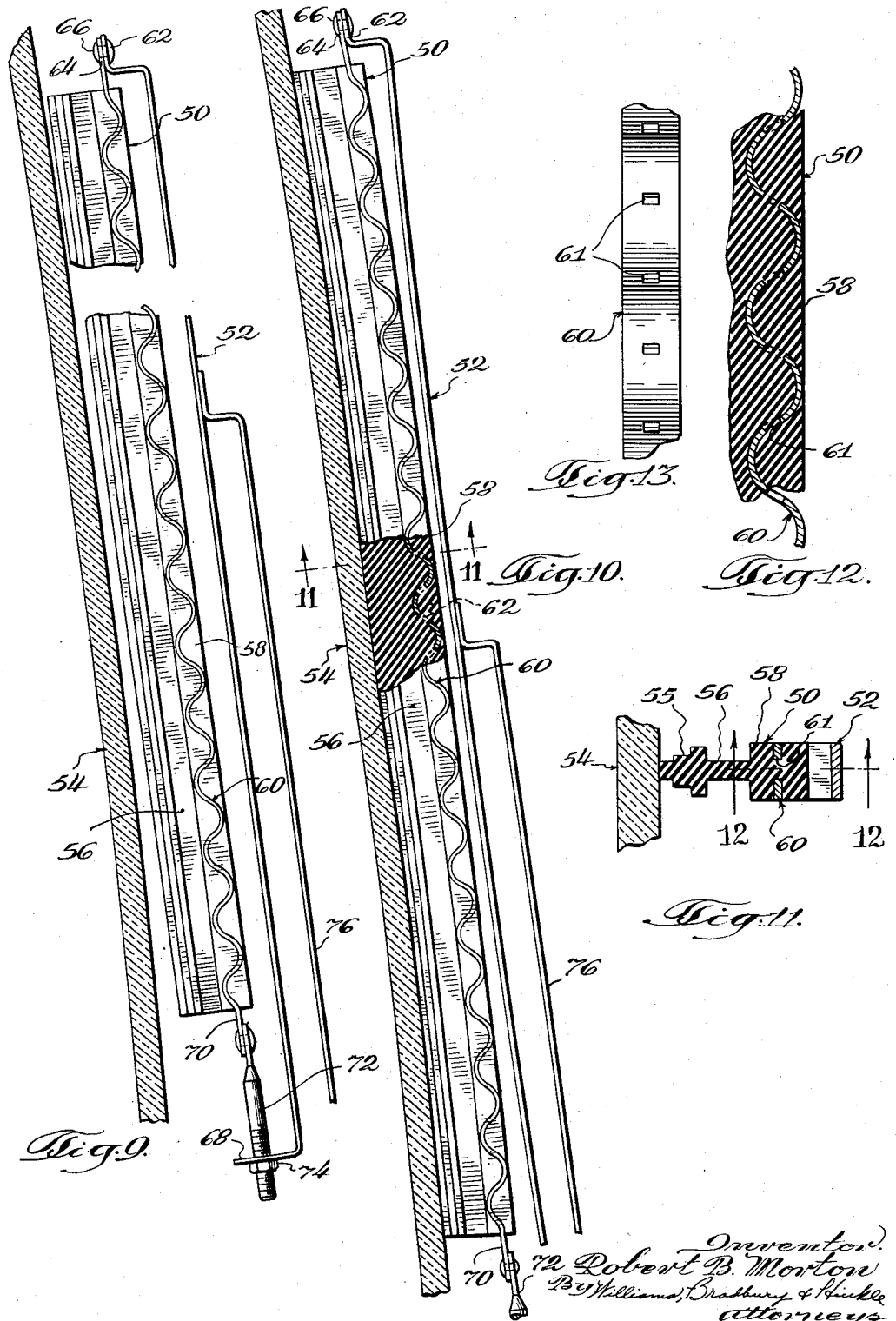

Patented Nov. 17, 1953

2,659,097

UNITED STATES PATENT OFFICE 2,659,097

WINDSHIELD WIPER

Robert B. Morton, Chicago, Ill., assignor to Stewart-Warner Corporation, Chicago, Ill., a corporation of Virginia Application May 18, 1945, Serial No. 594,551

4 Claims. (Cl. 15—245)

The present invention pertains to windshield wipers and has for its primary object the provision of a new and improved windshield wiper which may be utilized with equal facility in vehicles equipped with flat or curved windshields.

Another object of the present invention is to provide a new and improved windshield wiper having a wiping element flexibly supported so that its windshield contacting edge is readily conformable to the contour of the windshield.

Another and more specific object of the present invention is to provide a new and improved windshield wiper of the character aforesaid wherein the wiping element is supported under tension and preferably in a resilient supporting arm through which pressure is applied to maintain the wiping element in contact with the windshield and by means of which the wiping element more readily assumes a position corresponding to the contour of the windshield.

A further object of the present invention is to provide a new and improved windshield wiper having a wiping element including resilient means embedded therein at the side farthest from the windshield contacting edge.

A further object of the present invention is to provide a new and improved windshield wiper capable with equal facility to wipe flat and curved windshields and provided with means for preventing rolling of the wiping element during operation.

A further object of the present invention is to provide a new and improved windshield wiper which may be readily curved to conform the windshield wiping edge to the contour of the windshield and wherein the curvature may be changed to fit different windshields or adjusted from time to time as required.

Other objects and advantages of the present invention will become apparent from the ensuing description thereof, in the course of which reference is had to the accompanying drawings, in which:

Fig. 1 is a fragmentary side elevational view of one embodiment of the invention, the windshield wiper being illustrated out of contact with the windshield;

Fig. 2 is a view similar to Fig. 1 showing the wiping element in contact with the windshield. The view is partly broken away in order to illustrate certain details of construction;

Fig. 3 is a cross sectional view through the windshield wiper taken along the line 3—3 of Fig. 1;

Fig. 4 is a front elevational view, the view being taken along the line 4—4 of Fig. 1, and with the supporting and actuating arm removed;

Fig. 5 is a side elevational view, partly broken away, of another embodiment of the present invention;

Fig. 6 is an enlarged cross sectional view through the wiping element shown in Fig. 5, the view being taken along the line 6—6 of the latter figure;

Fig. 7 is a bottom elevational view taken along the line 7—7 of Fig. 5;

Fig. 8 is an enlarged fragmentary elevational view of the resilient member embedded within the wiping element of the windshield wiper illustrated in Fig. 5;

Fig. 9 is a side elevational view of another embodiment of the present invention characterized particularly in that it includes means for readily adjusting the tension and thereby adjust and pre-curve the wiping element;

Fig. 10 is an enlarged side elevational view, illustrating the windshield wiper of Fig. 9 in contact with the windshield. The view is partly broken away to illustrate constructional details;

Fig. 11 is an enlarged cross sectional view taken along the line 11—11 of Fig. 10;

Fig. 12 is a fragmentary cross sectional view taken along the line 12—12 of Fig. 11; and Fig. 13 is a fragmentary plan view of the resilient means embedded within the wiping element illustrated in Figs. 9 to 12, inclusive.

Referring now to the drawings and first to Figs. 1 to 4, inclusive, it may be noted that the windshield wiper of the present invention, indicated as a whole by reference character 10, is mounted at the end of a supporting and actuating arm 12 adapted to be oscillated in conventional manner by power means which may be of various types well known to those skilled in the art. The arm 12 is, in common with known arrangements, biased toward windshield 14 in known manner as by spring means (not shown) connected to it.

The windshield wiper of the present invention is usable on either flat or curved windshields. In Figs. 1 and 2 the windshield 14 is illustrated as being relatively flat at its lower portion as indicated by reference character 16, and curved at its upper portion as indicated by reference character 18.

The windshield wiper includes a wiper blade or wiping element, often called a squeegee, usually made of rubber and indicated as a whole by reference character 20. The wiping element may take various configurations, that of the present one being best indicated in Fig. 3. It comprises a stepped windshield engaging portion 22, a relatively narrow cross section intermediate portion 24, and a generally cylindrical outer portion 26 within which is embedded resilient spring means constituted by a helical spring 28.

The spring 28 supports the wiping element so that the windshield contacting edge of the wiping element is readily conformable to the contour of the windshield. The wiping element is supported under tension and preferably in a resilient or flexible generally U-shaped support indicated as a whole by reference character 30 and preferably made of spring metal. The central portion 32 of the support is relatively flat while the outer portions have side walls 34 of gradually increasing length and relatively closely spaced to the outer ends of the wiping element thereby tending to minimize rolling of the wiper blade as the blade is moved.

The windshield wiping element 20 is secured to its support by the projecting ends 36 of the spring which extend through small apertures at the inturned ends 38 of the support. The ends of the spring are bent over thereby securely to hold the wiping element and its support in assembled relation.

The lengths of the wiping element and the support are preferably chosen so that the spring 28 is placed under tension. This results in the flexing of the central portion 32 of the windshield wiper support 30, as best indicated in Fig. 1, which illustrates the apparatus when the wiping element is out of contact with the windshield surface.

When the windshield wiping element is brought into contact with and forced against the windshield surface, the spring is stretched, as is the associated portion of the element, thus allowing the contacting edge to conform to the contour of the surface of the windshield as indicated in Fig. 2. It may be noted that the greater the pressure at any region, the greater curvature of the element at that region. At the same time, the flexure of the supporting arm 30 decreases somewhat because of the pressure applied to it through the actuating arm 12. The latter is pivotally secured to the supporting arm as by a pin connection indicated generally by the reference character 40, see especially Fig. 3.

In the event the windshield surface is not uniform throughout the travel of the wiping element, then the curvature of the wiping element changes during movement so that it always conforms to the surface of the windshield with the result that an effective wiping of a curved windshield is possible. In the event the wiper is used on a flat windshield, the wiping element engages the flat surface, its curvature being governed by the surface engaged by it.

The embodiment of the invention illustrated in Figs. 5 to 8, inclusive, is similar to that described above except for the construction of the wiping element, here indicated by the reference character 42. The outer side 44 of the element is so constructed and arranged relative to the supporting arm 30 that rolling of the element during operation is more positively prevented. More specifically, portion 44 of the wiping element is of substantially square configuration and its outer ends fit relatively closely within the channel of the support provided by the walls 34 of gradually increasing length. Thus as the windshield wiper tends to roll in operation, the rolling is minimized by the walls 34 which are engaged by the portion 44 of the wiping element.

The windshield contacting portion 45 is also of slightly different configuration, it including a single step construction rather than the double step construction of the preceding embodiment.

The embodiment of the invention illustrated in Figs. 5 to 8 also includes a different type of tensioning means. The tensioning means comprises a generally sinusoidal strip 46 of thin spring metal provided with a series of spaced apart apertures 48 whereby the strip is more securely embedded in the enlarged portion 44 of the wiping element. The projecting ends 50 and 52 of the strip project through the end walls 38 of the supporting arm 30. One end 50 is secured to the end wall as by being bent over and soldered to it as indicated by reference character 54. The other end 52 is adjustably secured in place to provide a means for adjusting the tension. The securing means may take the form of a series of spaced apart apertures 56 in the projecting end and a cotter pin 58 passing through a selected one of the apertures 56 and engaging the outer side of the end wall 38.

The operation of the apparatus illustrated in Figs. 5 to 8 is substantially the same as that of the earlier described embodiment and it is deemed unnecessary to repeat it at this point.

The embodiment of the invention illustrated in Figs. 9 to 13, to which reference is now had, includes means for more readily adjusting the tension applied to the outer portion of the wiping element, here indicated by the reference character 50. A different type of support 52 is also provided and a windshield 54 having a somewhat different curvature from the windshield 14 is illustrated.

The wiping element includes a windshield surface contacting portion 55 of the multiple step type, an intermediate portion 56 of the thinner section and a generally square outer portion 58. The resilient means in the wiping element includes a generally sinusoidal strip 60 of spring metal provided with a series of apertures 61 whereby it is more readily embedded in and secured to the wiping element.

The support 52 is a generally U-shaped piece of metal, one end 62 of which is fixedly secured to the adjacent projecting end 64 of the strip 60 by suitable means, such as a rivet 66. The other end 68 of the U-shaped member is adapted adjustably to be secured to the other projecting end 70 of the strip 60, as by a threaded stud 72 secured to the end 70 of the spring and passing through the portion 68 of the support 52. The tension applied to the spring 60 is adjustable by means of a nut 74 associated with the stud 72. Rotation of the nut 74 enables the tension applied to the spring to be varied within the desired limits.

The wiper is adapted to be actuated through an oscillatable support lever 76 through suitable mechanism not shown.

In the illustrated embodiment of the invention no substantial tension is applied to the wiping element through the spring 70, as indicated best in Fig. 9. However, when the wiping element is pressed against the surface of the windshield the wiping element is curved to conform to the shape of the windshield as indicated in Fig. 10.

One of the advantages of the embodiment of the invention presently being described is that the wiping element may be precurved by increasing the tension applied to the spring. This is desirable in certain installations. The greater the tension applied to the spring and to the outer edge of the wiping element, the greater the curvature applied to the surface contacting portion 54 of the wiping element.

Windshield wipers constructed in accordance with the present invention may thus be applied to either flat or curved windshield and they will operate effectively over a reasonable range of configurations. Furthermore, they may be adjusted to fit windshields having different curvatures and may be designed to fit windshields of widely varying configurations.

While a plurality of embodiments of the invention have been described in detail, it should be understood that the specific details thereof are not intended to be limitative of the invention except insofar as set forth in the accompanying claims.

Having thus described my invention, what I desire to secure by Letters Patent is:

1. A windshield wiper, including in combination, a flexible wiping element having a wiping edge, an outer portion opposite the wiping edge, means connected with the outer portion only of said wiping element for supporting said wiping element under longitudinal tension, and means connected with said outer portion only of said wiping element for adjusting the tension applied to said wiping element.

2. A windshield wiper, including in combination, a flexible wiping element having a wiping edge, an outer portion opposite the wiping edge, a portion intermediate the wiping edge and said outer portion, a sinusoidal flat spring embedded in said outer portion, said spring having a series of apertures spaced apart therein, means including a flexible support spaced from the outer portion of the wiping element, and means for securing the ends of the spring between the ends of the support for movably supporting the wiping element.

3. A windshield wiper, including in combination, a flexible wiping element having a wiping edge, an outer portion opposite the wiping edge, a portion intermediate the wiping edge and the outer portion, spring means embedded in the outer portion of the wiping element, means including a flexible support spaced from the outer portion of the wiping element, said flexible support having end portions with side walls of gradually increasing height which enclose parts of the outer portion of the wiping element near the ends of said outer portion, and means for securing the ends of the spring means between the ends of the support for movably supporting the wiping element.

4. A windshield wiper, including in combination, a flexible wiping element having a wiping edge, an outer portion opposite the wiping edge, a portion intermediate the wiping edge and the outer portion, spring means embedded in the outer portion of the wiping element, means including a flexible support spaced from the outer portion of the wiping element, said flexible support having side wall portions of substantial length only at its ends, said side wall portions enclosing parts of the outer portion of the wiping element near the ends of said outer portion, and means for securing the ends of the spring means between the ends of the support for movably supporting the wiping element.

ROBERT B. MORTON.

References Cited in the file of this patent

UNITED STATES PATENTS

| Number | Name | Date |
| --- | --- | --- |
| 126,693 | Granger | May 14, 1872 |
| 1,998,762 | Hueber | Apr. 23, 1935 |
| 2,167,207 | Horton | July 25, 1939 |
| 2,198,698 | Fitzmeyer | Apr. 30, 1940 |
| 2,243,518 | Bailey | May 27, 1941 |
| 2,250,331 | Horton | July 22, 1941 |
| 2,265,551 | Steccone | Dec. 9, 1941 |
| 2,303,694 | Horton | Dec. 1, 1942 |

FOREIGN PATENTS

| Number | Country | Date |
| --- | --- | --- |
| 191,846 | Great Britain | Jan. 24, 1923 |
| 433,467 | Great Britain | Aug. 15, 1935 |
| 820,156 | France | July 26, 1937 |